Feb. 27, 1968    J. H. ROBSON    3,370,695
VARIABLE SPEED CONVEYOR
Filed April 29, 1966    2 Sheets-Sheet 2
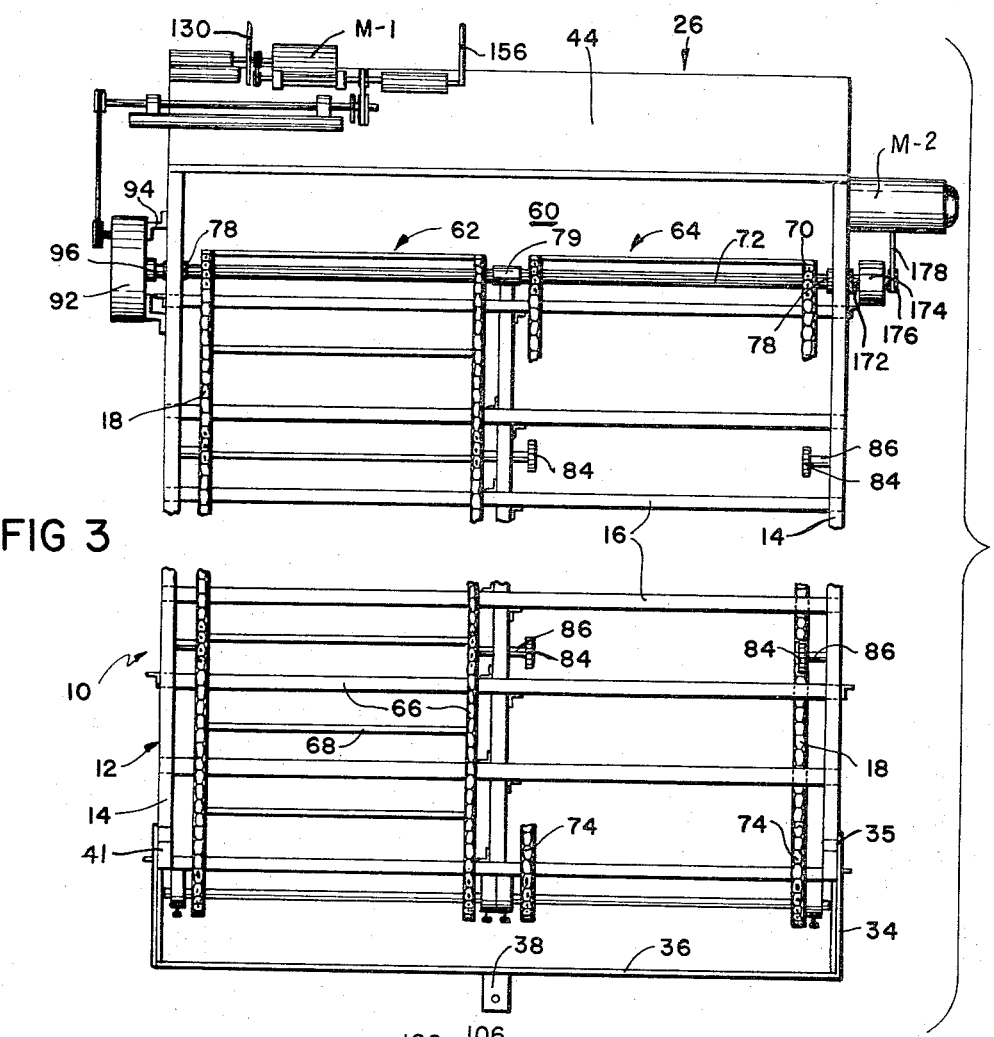
INVENTOR.
JOHN H. ROBSON
BY Harbaugh and Thomas
HARBAUGH and THOMAS ATTY'S United States Patent Office 3,370,695
Patented Feb. 27, 1968

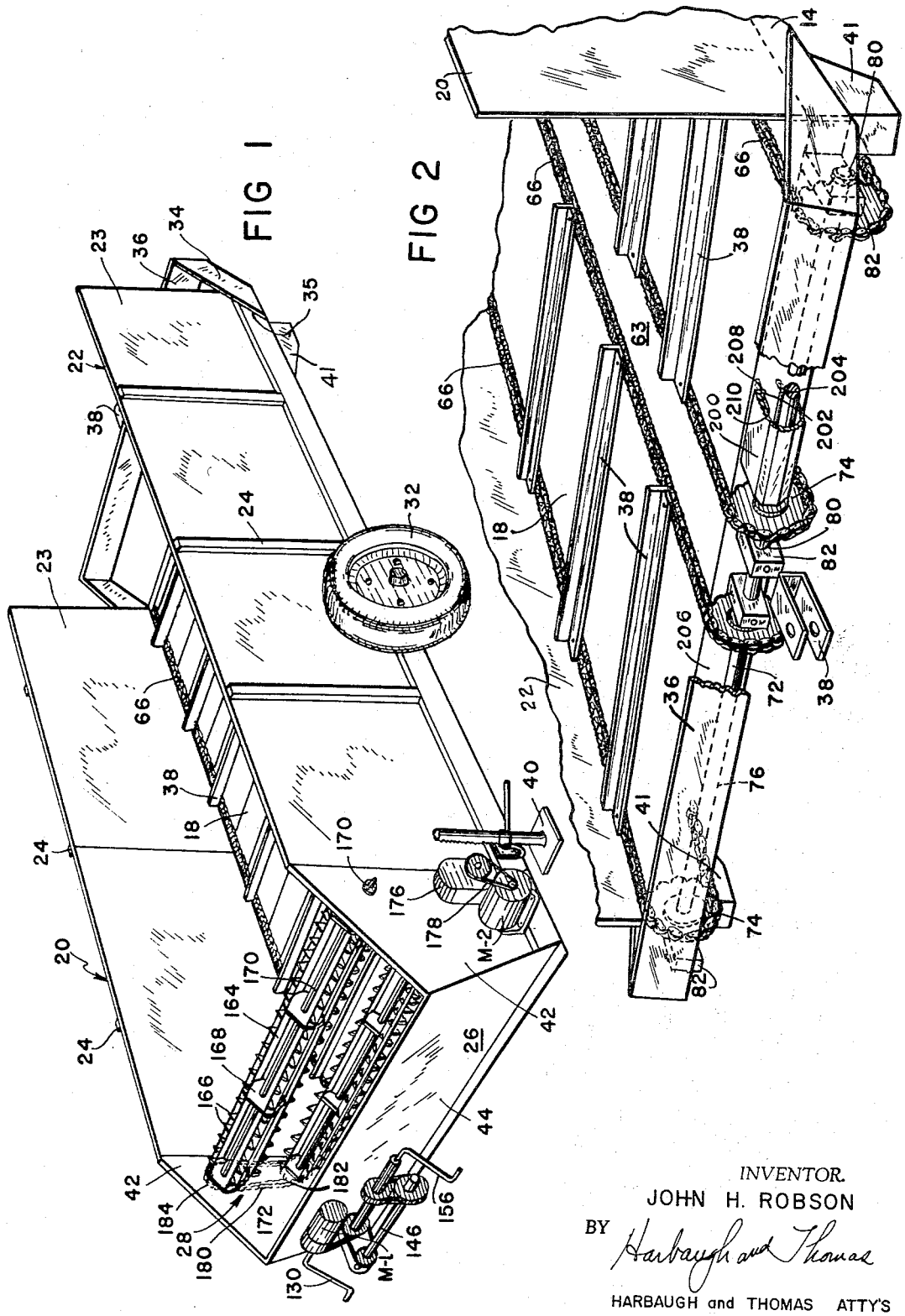

3,370,695
VARIABLE SPEED CONVEYOR
John H. Robson, Rte. 1, Box 441,
Crystal Lake, Ill. 60014
Filed Apr. 29, 1966, Ser. No. 546,455
7 Claims. (Cl. 198—103)

ABSTRACT OF THE DISCLOSURE

A self-unloading transfer feeder intermittently receiving quickly emptied dump truck loads of chopped silage and delivering same to a silage conveyor and processing equipment at a constant rate commensurate with the capacity of the equipment, the delivery rate being controlled by two speed controls connected in series with either one adjustably varying the delivery speed from a speed determined by the prime mover and a fixed gear reduction transmission.

---

The improved feeder comprising the present invention has been designed for use primarily in connection with the transfer of chopped vegetation from a dump truck to a silo-filling machine at the silo, specifically to a horizontal conveyor which feeds the discharged material to the silo-filling blower. The invention is however capable of other uses and feeders embodying the principles of the present invention may, if desired, be employed for feeding dumped materials to a dryer or other material-treating apparatus with or without modification as required. Irrespective however of the particular use to which the invention may be put, the essential features thereof are at all times preserved.

The use of dump trucks, as distinguished from tractor-drawn wagons, for silo-filling operations, is advantageous in many respects. Dump trucks are able to move chopped materials rapidly over relatively long distances and they are able to operate in fields which would be too wet or soft for a tractor to tow a heavily loaded wagon. Accordingly, the present feeder has been specifically designed for use and cooperation with dump trucks of different capacities to facilitate transfer of its load efficiently from the discharge end of the truck to the conveyor with a minimum of manual labor and at a rate that is commensurate with the capacity of the silo-filling blower.

To attain the desired results, the invention contemplates the provision of a wheeled vehicle which, for purposes of transportation from one place to another, is provided with permanently mounted wheels, a combined protective bumper and a hitch assembly. The vehicle chassis includes a wide flat rectangular deck or platform with upstanding marginal side panels, the rear end of the structure is supported on feet and being open and it constitutes the receiving end of the vehicle. The platform also is relatively long to accept and accommodate quickly emptied truck loads, yet not overload the conveyor discharge means with any temporary resulting load surges. An endless conveyor cooperates with the platform slidably thereover to move two series of transverse flight bars continuously forwardly over the platform at variable speeds and slightly upwardly and thus carry the material which is dumped thereon forwardly and feed it to a beater assembly which is mounted at the front of the platform. The beater assembly includes upper and lower rotary beaters which operate within a hopper at the forward end of the platform, the lower end of the hopper being open and designed for register with a conventional horizontal silo-feeding conveyor substantially at ground level. The vehicle is equipped with two wheels on transverse stub axles which are disposed substantially centrally of the platform. The weight of the beater assembly and hopper at the front of the platform could cause the latter to be out of balance in a forward direction and accordingly, a pair of self-contained jacks are carried at the front of the platform to be adjusted so that the hopper may find proper register with the silo-feeding conveyor.

Both the conveyor and the beater assembly are electrically powered. Separate electric motors are provided for driving the conveyor and the beater assembly so that variations in the speed of the conveyor will not affect the speed of the beater assembly. Novel means are provided whereby the speed of the conveyor may be varied within wide limits to accommodate the truck load receiving capacity and the capacity of the silo-filling conveyor, such means being operable while the feeder is in actual operation so that overfeed and underfeed operations may be corrected by observing the discharge from the feeder and regulating the conveyor speed accordingly, and properly correlate the feeder discharge with the ability of the silo-filling conveyor to receive the discharge material. An additional feature of the present invention resides in the provisions of two separable operable speed control devices connected in series in the transmission train for regulating the speed of the conveyor whereby, when small incremental adjustments of speed are required, each may be operated by operators at different locations with respect to the feeder, one control being positioned at the loading end of the feeder and another control being positioned at one side of the feeder yet both devices operating in series provide a wide speed range with their total adjustments. Thus, a single operator is not obliged to make speed adjustments at the same location each time an adjustment is required, it being necessary for him to be at the nearer of the two available control stations to make the required adjustment for either or both receiving and filling operations while performing other duties also at either station.

The invention is characterized by the provision of a silo-feeder which is extremely simple in its construction and which may therefore be manufactured at a low cost; one which is comprised of a minimum number of parts, particularly moving parts disposed to carry heavy loads where heavy loads are, and which therefore is unlikely to get out of order; one which is rugged and durable to withstand rough usage, one which is capable of ease of assembly for manufacturing and disassembly for purpose of inspection of parts, or removal thereof for purposes of replacement or repair; one which is smooth and relatively silent in its operation; and one which, otherwise is well adapted to perform the services required of it. Other and further desirable features concerning production and safety are also advantages of the present invention, and will readily reveal themselves as the nature of the invention is described and better understood.

In the accompanying three sheets of drawings forming a part of this specification, a preferred embodiment of the invention has been shown:

FIG. 1 is a perspective view of a silo feeder embodying the present invention and showing the same set-up for operation;

FIG. 2 is an enlarged fragmentary perspective view of the loading end of the feeder;

FIG. 3 is a bottom plan view of the feeder; and

FIG. 4 is a schematic view of a portion of the conveyor driving power train and its associated control instrumentalities.

In all of the above described views, similar characters of reference have been employed to designate similar parts throughout.

Referring now to the drawings in detail and in particular to FIGS. 1 to 3 inclusive, a feeder embodying the principles of the present invention has been designated in its entirety at 10 and it involves in its general organization a chassis or framework 12 of rectangular configuration including longitudinal metal frame members 14 in the from of angle pieces, and transverse frame bars 16 which may be in the form of conventional 2" x 6" wood stock. The framework further includes a sectional plywood platform 18 which may be screwed or otherwise secured to the transverse frame bars 16. A pair of rectangular side walls 20 and 22 project upwardly from the marginal side edges of the platform 18. These side walls consists of plywood sheets 23 which are reinforced by metal studding 24 welded or otherwise secured to the longitudinal frame members 14. The platform 18 and side walls 20 and 22 constitute a feeder receptacle 24, the loading end of which is open. The discharge end of the feeder receptacle communicates with a feeder hopper 26 containing a beater assembly 28, the nature of which will be described presently.

The framework 12 further includes an axle assembly 30 carrying traction wheels 32 of the conventional rubber tire variety. At the loading end of the feeder receptacle 24 there is provided a combined hitch and bumper assembly in the form of a generally U-shaped frame having inclined side legs 34 welded as at 35 to the longitudinal frame member 14, and a transverse connecting bumper proper 36 adapted to be engaged by the rear wheels of a dump truck. A conventional drop-pin hitch 38 is carried medially of and below the bumper proper 36. The axle assembly 30 is disposed approximately medially of the ends of the platform 18. Due to the weight of the hopper 26 and its associated beater assembly 27, the feeder as a whole possesses a degree of unstable equilibrium which affords a tendency for the feeder to tilt in the direction of its front end. Thus, to stabliize the feeder when in use, a pair of captured jack assemblies 40 are carried on the longitudinal frame members 14 at regions spaced a slight distance inwardly from the front ends of these members. At the rear end of the feeder, a pair of supporting feet 41 cooperate with the jack assemblies 40 to provide a four-point suspension for the feeder when the latter is in use.

The hopper 26 is comprised of vertically disposed trapezoidal side plates 42 and an inclined rectangualr front plate 44 (FIGS. 1 and 4) suitably reinforced and secured together in edge to edge relationship by angle bars 46.

It is to be noted with the present invntion, that the greatest portion of the weight of material dumped thereon and the greatest effort to move it is at the longitudinal central portion of the receptacle and to avoid undue strain upon two sprockets and chains at the ends of long flights of a single conveyor, two conveyor assemblies side by side are provided driven by four sprockets with substantial space between them. It has been discovered that with this space the heavier portion of the load slides along the open space while holding down the chain and flights with little if any tendency of the flights to climb over lower portions of the weighted material rather than propel all the material along smoothly. Irregular operation occurs where long flights medially under heavy load flex and tend to slide over material frictionally engaging the bed bottom.

Accordingly, as best seen in FIGS. 1 to 3 inclusive, the wide platform 18 has associated therewith an endless conveyor assembly 60 consisting of substantially identical side-by-side conveyor sections 62 and 64 leaving a space or slide path 63 between them wide enough to bear a substantial portion of the weight thereabove. Each section includes a pair of endless conveyor chains 66 and a series of transverse conveyor flights in the form of angle irons 68. The various chains 66 pass over drive sprockets 70 mounted on a drive shaft 72 and driven sprockets 74 mounted on a driven shaft 76. The drive shaft 72 is rotatably journalled at its ends in bearings 78 carried by the longitudinal frame members 14. A central bearing 79 serves to support the medial region of the drive shaft 72.

The driven shaft 76 is rotatably journalled at its ends in bearings 80 (FIG. 2) carried by support blocks 82 which project rearwardly from the framework 12. The drive shaft 72 and driven shaft 76 are disposed substantially in the plane of the plywood platform 18 so that the conveyor chains and their respective flights 38 encompass the platform, passing forwardly toward the beater assembly 27 over the platform and returning rearwardly toward the loading end of the feeder below the platform. Idler sprockets 84 (FIG. 3), carried on stub shaft 86 beneath the platform serve to support the conveyor chains 66 during the return movement thereof.

The width of the slide path permits medial material to contact the slide path with pressure so that the adjacent end corners of the flight embed themselves in the load while the chains and flight members are held against rising when moving the load material along at any and all variable speeds. Slide wear of the chains and flights on the bed bottom is substantially less and economies in electric power consumed are attained. The material is more widely spread and the concentration of weight load is less as compared with a conventional narrower bed, a single conveyor and a deeper pile of material thereon.

The conveyor assembly 16 is adapted to be driven by an electric motor M1, (FIGS. 1, 3 and 4) suitably supported on the hopper wall 44. As will be described in greater detail presently, the motor M operates through a power train including two sets of speed control devices to apply power to the input shaft 90 of a gear reduction device 92 which is secured by brackets 94 to one of the longitudinal frame members 14. The output 96 of the gear reduction device 92 is coupled to the aforementioned drive shaft 72 by means of a conventional protective shear pin union 98.

The previously mentioned power train which extends between the motor M1 and the gear reduction device 92 is best seen in FIG. 4 and it includes first and second Reeves type variable speed pulley assemblies 100 and 102 which are disposed in series in the power train. Accordingly, the output shaft 104 of the Motor M1 carries an axially fixed pulley section 106 which cooperates with an axially shiftable pulley section 108, the two pulley sections constituting a composite split-driving pulley arrangement which cooperates with a similar split driven pulley arrangement in which the axially shiftable pulley section 110 is yieldingly spring pressed toward the axially fixed pulley section 112. A V-belt passes over both pulley arrangements. The section 112 is carried on a jack shaft 114 which is rotatable in bearings 116 secured to the hopper wall 44.

A reaction member 118 in the form of a tube 120 supported on an attachment bracket 122, is formed with a helical slot 124 therein and an actuating rod 126 projects through the tube 120 and carries a radial pin 128 which rides in the slot 124 so that upon turning of the rod 126 in opposite directions the latter will be shifted axially toward and away from the axially shiftable pulley section 108. A handle 130 on the outer end of the rod 126 facilitates turning of the rod. The rod 126 is frictionally retarded in its rotational movement so that it will remain in a static condition in all positions of the handle 130, suitable spring retarding means (not shown) being provided for this purpose. The rod 126 is capable of axial movement between one extreme position wherein it engages the pulley section 108 and forces it toward the pully section 106 to attain a maximum speed ratio drive between the motor drive shaft 104 and the jack shaft 114, and another extreme position wherein the rod 126 releases the pulley section 108, in which case the motor shaft 104 is disconnected from the jack shaft 114. In various intermediate positions of the rod 126, commensurate speed ratios ranging downwardly from the maximum speed ratio will be attained as is conventional in connection with Reeves type split pulley arrangements.

The previously described pulley arrangement including the various pulley sections 106, 108, 110 and 112, together with the control device 118 constitutes the variable speed control assembly 100. The control assembly 102 is substantially identical with the assembly 100 and it includes a split driving pulley assembly 140 and a cooperating split driven pulley assembly 142, the two assemblies having associated therewith a V-belt 144. The driven pulley assembly 142 is mounted on a second jack shaft 146 rotatably journalled in bearings 148 carried by the hopper wall 44. The shaft 144 carries a pulley 150 which is connected by a belt 152 to a second and smaller pulley 154 mounted on the previously mentioned input shaft 90 of the gear reduction device 92. A control handle 156 operates through a reaction member 158 identical with the reaction member 118 to actuate the variable speed pulley assembly 102.

The beater assembly 28 includes upper and lower beater rotors 160 and 162 respectively, the two rotors being substantially identical in construction. Each beater rotor is in the form of a cage-like structure including a series of four elongated bars 164 carrying beater teeth 166 thereon, the bars being suitably mounted on transversely spaced hubs 168. The hubs of the upper beater rotor 160 is mounted on a driven shaft 170 which extends across the hopper 26 and has its opposite ends rotatably journalled in the side plates 42. The hubs of the lower rotor assembly 162 are similarly mounted on a drive shaft 172 likewise journalled in the side plates 42. This latter shaft 172 is operatively connected to the output shaft of a gear reduction device 174 (FIG. 3), the input shaft 176 of which is connected by a belt and pulley arrangement 178 to an electric motor M2 suitably mounted on one side plate 42 of the hopper 26. The drive shaft 172 of the beater assembly is operatively connected to the driven shaft 170 in driving relationship by means of a chain 180 which passes over sprockets 182 and 184 on the respective shafts.

In the operation of the feeder 10, after the same has been pulled to a given scene of operations, the hitch 38 will be released from the towing vehicle so that the feeder may be manipulated into a position of effective association with the horizontal material-receiving conveyor, (not shown) associated with silo-filling operations, the upper or discharge end of the hopper 26 overlying such conveyor in feeding relationship. Thereafter, the jack assemblies are released and adjusted to support the forward end of the feeder while the supporting feet 41 are caused to engage the ground surface so that the feeder is supported at four points, not to mention the wheel supports.

With the feeder 10 thus in operative position, successive dump trucks may be backed up to the open loading end of the feeder receptacle 24 to proper position against the bumber and the materials carried thereby are quickly unloaded directly onto the wide plywood platform 18 where they provide a working reserve as rapidly as desired between truck loads that can be conveyed. The trucks are not delayed by a slow and careful dumping otherwise required to prevent overfilling or spillage and the speeds of the feeder can be regulated with respect to the rapidity of truck deliveries as well as the silo-filling feeder for constant operation. It is encouraging to be able to move without delay when rain clouds are gathering when silos are being filled.

It will be understood that suitable control circuitry is provided for the electric Motors M1 and M2 and, if desired, a control panel (not shown) may be mounted on the feeder chassis at a conveniently accessible location where dangers might arise. With both motors M1 and M2 energized, the unloaded material from the dump truck will be conveyed forwardly over the platform 18 by reason of the forwardly travelling conveyor flights 16 and delivered to the hopper 26 where the material will be processed by the upper and lower beater rotors 160 and 162 and impelled downwardly for discharge into a silo-filling conveyor.

A protective shield 200 of generally U-shape cross section encloses and conceals a major portion of the conveyor drive shaft 72. This protective shield 200 has inturned edges 202 which are bolted as at 204 to a transverse frame member 206 which extends between the side frame members 14. An angle piece 208 serves to reinforce the upper region of the shield 200 and is secured to the frame member 206 by bolts 210. The upper horizontal surface of the protective shield 200 constitutes, in effect, a forward extension of the platform 18.

It is to be noted that by reason of the two manually operable variable speed pulley assemblies 100 and 102 which are disposed in a common power train in series relationship, an extremely wide range of conveyor driving speeds may be obtained. Furthermore, because the two control handles 150 and 156 are disposed at widely separated regions where they are accessible from one side and from the rear of the feeder chassis, speed changes within certain limits may be effected from either location, as well as a complete shut down of the conveyor movements.

The invention is not to be limited to the exact arrangement of parts shown in the accompanying drawings or described in this specification, as various changes in the details of construction may be resorted to without departing from the spirit of the invention. Therefore, only insofar as the invention has particularly been pointed out in the accompanying claims, is the same to be limited.

I claim:

1. In a portable feeder of the character described, a horizontally extending, elongated platform and vertical side walls projecting upwardly from the longitudinal side edges of said platform defining an open-ended receptacle wide enough at its receiving end to receive the dumping end of a truck, an endless conveyor means lengthwise encompassing said platform and having an advancing straightaway portion overlying the platform and a returning lower straightaway portion underlying the same, said conveyor means including transverse flights movable over said platform for impelling material thereon, a hopper disposed adjacent the delivery end of said platform for receiving material from said receptacle, a beater assembly operatively disposed within said hopper and including upper and lower beater rotors, means operatively connecting said rotors for rotation in unison, a prime mover operatively connected to one of said beater rotors in driving relationship, a second prime mover for driving said conveyor means, and a power train extending between said second prime mover and the conveyor, said power train including a plurality of manually controlled variable speed transmission, one of said manually operable variable speed transmission assemblies being disposed at the dispensing end of the platform and the other manually operable variable speed assembly being disposed at one side of said platform, and means whereby each of said assemblies is capable of adjustment between a condition of maximum speed range and a condition of complete disengagement.

2. A portable feeder as called for in claim 1 in which said conveyor means comprises two conveyor assemblies side by side driven at the same speed and spaced a substantial distance apart to provide an uninterrupted slide path between them the length of said platform, adjacent edges of said conveyor means having upstanding angle iron flight corners embedding themselves in the material deposited medially upon said platform.

3. The combination called for in claim 1 in which said power train includes independently controlled first and second manually operated variable speed transmission assemblies connected in series in said power train.

4. A portable feeder as called for in claim 3 in which said conveyor means comprises two conveyor assemblies side by side driven at the same speed and spaced a substantial distance apart to provide an uninterrupted slide path between them the length of said platform, said transverse flights having flat portions slidable upon said platform and upright portions engaging material unloaded onto said platform adjacent ends of the two flights at said slide path having upstanding corners embedding themselves in the material deposited medially upon said platform along said slide path.

5. In a portable feeder, the combination set forth in claim 4, wherein the rotational axes of said beater rotors and said conveyor drive shaft are arranged in a common vertical plane, said drive shaft having four sprocket wheels upon it for simultaneously driving said conveyor assemblies at the same speed.

6. In a portable feeder, the combination set forth in claim 3, wherein said endless conveyor includes sprocket supporting driving and driven shafts disposed substantially in the common horizontal plane of the platform adjacent the rear and front ends of the latter respectively, and a protective shield encompassing said drive shaft and interposed between adjacent sprockets on said latter shaft.

7. In a portable feeder, the combination set forth in claim 6 and wherein said protective shield is provided with a planar horizontal surface which, in effect, constitutes a rearward extension and continuation of said platform surface.

References Cited
UNITED STATES PATENTS

| | | | |
|---|---|---|---|
| 3,189,204 | 6/1965 | Wiberg | 214—519 |
| 3,214,050 | 10/1965 | McConeghy | 214—519 |
| 3,214,049 | 10/1965 | Grove | 214—519 |
| 3,223,264 | 12/1965 | Towne | 214—519 |

RICHARD E. AEGERTER, *Primary Examiner.*

EVON C. BLUNK, *Examiner.*

A. C. HODGSON, *Assistant Examiner.*